(12) United States Patent
Abbott

(10) Patent No.: US 6,525,104 B2
(45) Date of Patent: Feb. 25, 2003

(54) STEAM REFORMING

(75) Inventor: Peter Edward James Abbott, Eaglescliffe (GB)

(73) Assignee: Johnson Matthey PLC (GB)

( * ) Notice: Subject to any disclaimer, the term of this patent is extended or adjusted under 35 U.S.C. 154(b) by 55 days.

(21) Appl. No.: 09/781,312

(22) Filed: Feb. 13, 2001

(65) Prior Publication Data

US 2002/0006968 A1 Jan. 17, 2002

Related U.S. Application Data

(63) Continuation of application No. PCT/GB99/02286, filed on Jul. 15, 1999.

(30) Foreign Application Priority Data

Aug. 13, 1998 (GB) .............................................. 9817526

(51) Int. Cl.[7] .............................................. C07C 27/06
(52) U.S. Cl. ...................................... 518/704; 252/373
(58) Field of Search ........................... 252/373; 518/704

(56) References Cited

U.S. PATENT DOCUMENTS

| | | | |
|---|---|---|---|
| 2,579,843 A | | 12/1951 | Mader |
| 4,479,925 A | | 10/1984 | Shires |
| 4,822,521 A | * | 4/1989 | Fuderer ...................... 252/373 |
| 4,824,658 A | | 4/1989 | Karafian |
| 4,910,228 A | | 3/1990 | Lywood |
| 5,300,275 A | * | 4/1994 | Lywood ...................... 252/373 |
| 5,855,815 A | * | 1/1999 | Park et al. .................. 252/373 |

FOREIGN PATENT DOCUMENTS

| | | |
|---|---|---|
| EP | 0342610 A3 | 11/1989 |
| GB | 2179366 | 8/1985 |

* cited by examiner

*Primary Examiner*—Wayne A. Langel
(74) *Attorney, Agent, or Firm*—Pillsbury Winthrop LLP

(57) ABSTRACT

Production of synthesis gas for use for synthesising carbon-containing compounds, typically having a hydrogen to carbon monoxide molar ratio of about 2 and a low carbon dioxide content, by primary reforming a gaseous mixture containing hydrocarbons, 0.6 to 2 moles of steam per gram atom of hydrocarbon and 0.2 to 0.6 moles of recycled carbon dioxide per gram atom of hydrocarbon, in a heat exchange reformer and then secondary reforming the resultant primary reformed gas, heating the heat exchange reformer with the resultant secondary reformed gas; cooling and condensing steam from the secondary reformed gas to give a de-watered gas stream having a carbon dioxide content below 20% by volume. The recycled carbon dioxide is recovered from the de-watered gas stream, before or after use thereof for the synthesis reaction.

10 Claims, 3 Drawing Sheets

STEAM REFORMING

Figure 1:
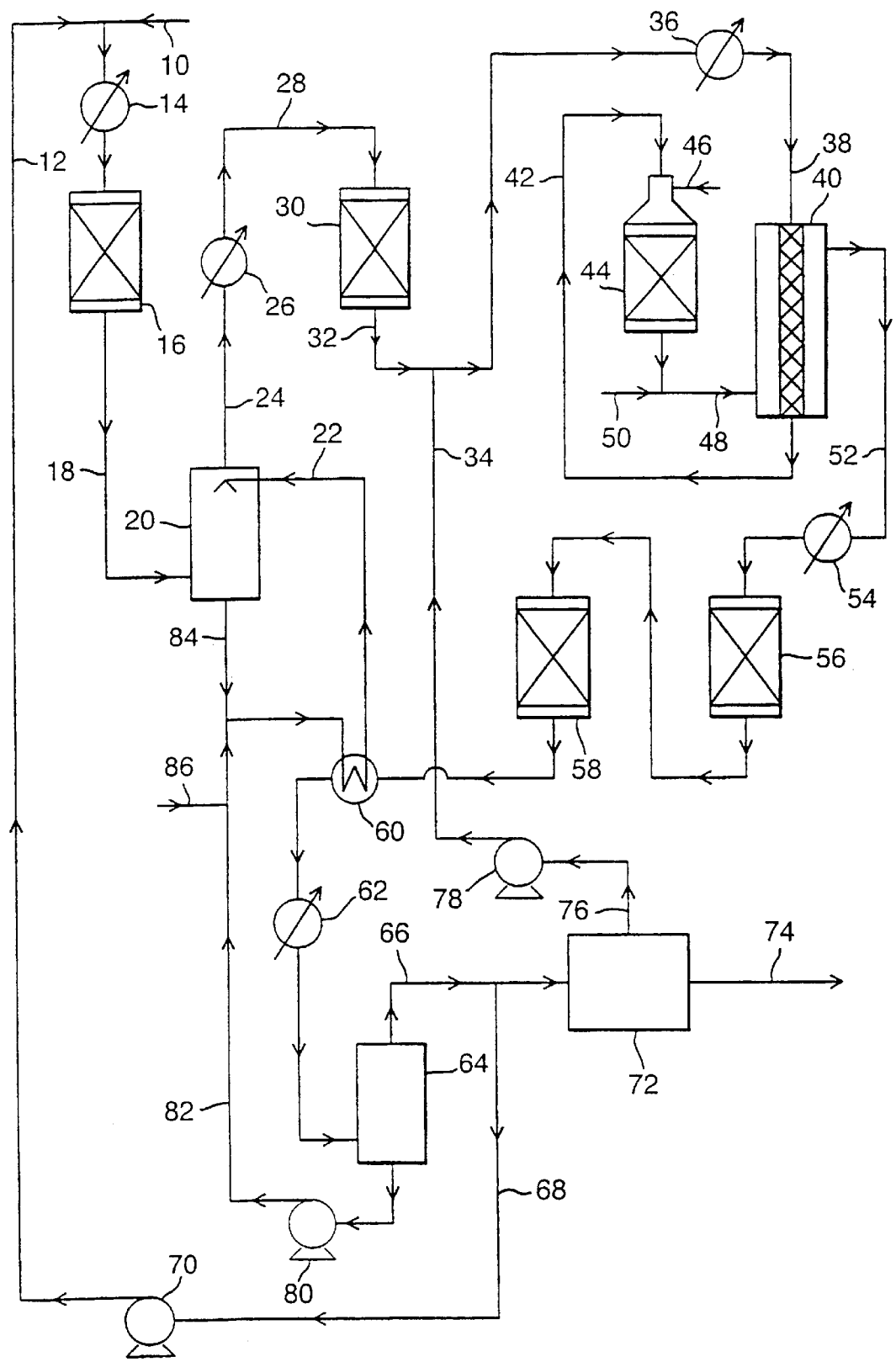

This application is a continuation of PCT/GB99/02286 filed Jul. 15, 1999.

This invention relates to steam reforming and in particular to the catalytic steam reforming of hydrocarbons. Steam reforming is widely practised and is used to produce hydrogen streams and synthesis gas for a number of processes such as ammonia, methanol and Fischer-Tropsch process for the synthesis of carbon-containing compounds such as higher hydrocarbons. In a steam reforming process, a desulphurised hydrocarbon feedstock, e.g. natural gas or naphtha, is mixed with steam and passed at elevated temperature and pressure over a suitable catalyst, often nickel on a suitable refractory support, e.g. alumina or calcium aluminate cement. The composition of the product gas depends on, inter alia, the proportions of the feedstock components, the pressure and temperature. The product normally contains methane, hydrogen, carbon oxides, steam and any gas, such as nitrogen, that is present in the feed and which is inert under the conditions employed. For applications such as methanol synthesis it is generally desirable that the molar proportions of hydrogen and carbon oxides are such that the value of $([H_2]-[CO])/([CO_2]+[CO])$, where $[H_2]$, $[CO_2]$ and $[CO]$ are the molar proportions of hydrogen, carbon dioxide and carbon monoxide respectively in the product, is about equal to 2. For applications such as Fischer-Tropsch synthesis, it is desired that the ratio of $[H_2]/[CO]$ is about 2 and the amount of carbon dioxide present is small. For other applications it may be desirable to have a $[H_2]/[CO]$ ratio below 2.

It has been proposed in U.S. Pat. No. 4,999,133 to make a synthesis gas having a low $CO_2$ content and a $[H_2]/[CO]$ ratio below 2.5 from feedstocks such as natural gas by a steam reforming process wherein in a first, primary reforming, stage part of the feedstock is reformed with steam in a fired furnace, the remainder of the feedstock is added to the primary reformed product of the first stage and the resultant mixture subjected to a stage of secondary reforming wherein the feed is subjected to partial combustion by the addition of oxygen and then passed over a secondary reforming catalyst. In an example there is described the production of a gas having a carbon dioxide content of 2.6% (on a dry basis) and a $[H_2]/[CO]$ ratio of 2.18 by reforming at a pressure of about 49 atms. abs. with a secondary reformer exit temperature of 1149° C. 83% of the feedstock bypasses the first reforming stage and over 0.51 moles of oxygen are added per gram atom of hydrocarbon carbon fed to the reforming stages. Not only is a large proportion of oxygen required, but also the high outlet temperature presents metallurgical problems and the need to introduce the feedstock that has bypassed the first reforming stage into the hot feed to the secondary reforming stage presents engineering difficulties.

It has been proposed in U.S. Pat. No. 4,910,228 to make synthesis gas having the stoichiometric composition for methanol synthesis but having a $[H_2]/[CO]$ ratio of about 2.9 by a primary/secondary reforming process using a heat exchange reformer for the primary reforming stage with the heat required for the primary reforming being supplied by the sensible heat in the secondary reformed product.

We have realised that by the use of a heat exchange reformer, the use of such large amounts of oxygen and consequent very high temperatures can be avoided and a product having the desired composition can be achieved if a major proportion, if not all, the carbon dioxide is separated from the secondary reformed product, before or after subsequent processing, and recycled to the feed. With a light feedstock, such as natural gas, a $[H_2]/[CO]$ ratio of 2 or below can be achieved even with recycle of substantially all of the carbon dioxide. This enables more synthesis gas to be made from a given amount of feedstock. On the other hand, with alternative processes such as autothermal reforming or partial oxidation, when using a light feedstock in order to obtain a $[H_2]/[CO]$ ratio of 2 some carbon dioxide has to be exported.

It has been proposed in GB 2 179 366 to produce a gas stream having a $[H_2]/[CO]$ value of about 2 using such a heat exchange reformer with recycle of carbon dioxide separated from the product. In the process of that reference part of the feedstock is fed to the primary, i.e. heat exchange, reformer while the remainder is fed to the directly to the secondary reformer. In the examples, the process was operated under conditions such that the product reformed gas (before carbon dioxide separation) had a relatively high carbon dioxide content, ranging from about 27% to about 42% by volume on a dry basis. The amount of carbon dioxide that was separated and recycled was thus large, and exceeded the amount of feedstock on a molar basis. The separation and recycle of such a large amount of carbon dioxide would render such a process uneconomic.

We have realised that such a process can be operated to produce a reformed gas having a significantly lower carbon dioxide content, thus obviating the need for separation and recycle of such large amounts of carbon dioxide.

Accordingly the present invention provides a process for the production of a gas for use in the synthesis of carbon-containing compounds comprising the steps of:

a) subjecting a gaseous mixture containing at least one hydrocarbon and 0.6 to 2 moles of steam per gram atom of hydrocarbon carbon in said mixture to catalytic primary reforming at an elevated temperature in a heat exchange reformer by passing said mixture through tubes containing a steam reforming catalyst heated by a hot gas stream flowing past the exterior of said tubes, thereby forming a primary reformed gas stream;

b) without the addition of further hydrocarbon, subjecting the primary reformed gas stream to secondary reforming wherein it is subjected to partial combustion with a gas containing free oxygen to form a hot partially combusted gas stream which is then passed through a bed of a secondary reforming catalyst, thereby forming a secondary reformed gas stream;

c) passing said secondary reformed gas stream past the exterior of the tubes of the heat exchange reformer as said hot gas stream, thereby heating the gas inside said tubes and cooling said secondary reformed gas stream;

d) further cooling said secondary reformed gas stream, condensing steam therefrom, and separating out the condensed water to give a de-watered secondary reformed gas stream, the reforming conditions being selected to give a de-watered secondary reformed gas stream having a carbon dioxide content below 20% by volume;

e) recovering carbon dioxide from said de-watered secondary reformed gas stream, before or after use of the latter for synthesis of the carbon-containing compounds, and f) adding the recovered carbon dioxide to the gaseous mixture before the latter is fed to the heat exchange reformer, the amount of recycled carbon dioxide being 0.2 to 0.6 moles per gram atom of hydrocarbon carbon in the gaseous mixture.

In the present invention, the primary reforming is effected using a heat exchange reformer. In one type of heat exchange reformer, the catalyst is disposed in tubes extending between a pair of tube sheets through a heat exchange zone. Reactants are fed to a zone above the upper tube sheet and pass through the tubes and into a zone beneath the lower tube sheet. The heating medium is passed through the zone between the two tube sheets. Heat exchange reformers of this type are described in GB 1 578 270 and WO 97/05 947.

Another type of heat exchange reformer that may be used is a double-tube heat exchange reformer as described in aforesaid U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. The external surface of the outer tubes is heated by the secondary reformed gas. The mixture of hydrocarbon feedstock, carbon dioxide and steam is fed to the end of the outer tubes remote from said closed end so that the mixture passes through said annular space and undergoes steam reforming and then passes through the inner tube. As in the double-tube reformer of the aforesaid U.S. Pat. No. 4,910,228, in the present invention preferably insulation is provided on the walls of the inner tube.

In the process of the invention a gaseous mixture is formed from a hydrocarbon feedstock, steam and the recycled carbon dioxide, and has a steam ratio of 0.6 to 2, i.e. it contains 0.6 to 2 moles of steam per gram atom of hydrocarbon carbon, and a carbon dioxide ratio of 0.2 to 0.6, i.e. it contains 0.2 to 0.6 moles of recycled carbon dioxide per gram atom of hydrocarbon carbon. As will be described, in some cases, the recycled carbon dioxide may contain hydrocarbons and so the carbon content of any hydrocarbons recycled with the carbon dioxide has to be added to that of the feedstock when computing the steam and carbon dioxide ratios.

The hydrocarbon feedstock may be any gaseous or low boiling hydrocarbon feedstock such as natural gas or naphtha. It is preferably methane or natural gas containing a substantial proportion, e.g. over 90% v/v methane. The feedstock is preferably compressed to a pressure in the range 20–100 bar abs. If the feedstock contains sulphur compounds, before, or preferably after, compression the feedstock is subjected to desulphurisation, e.g. hydro-desulphurisation and absorption of hydrogen sulphide using a suitable absorbent, e.g. a zinc oxide bed. Usually it is desirable to incorporate a hydrogen-containing gas into the feedstock prior to hydro-desulphurisation: a part of the de-watered secondary reformed gas can be used as the hydrogen-containing gas. Alternatively, where the recycled carbon dioxide also contains hydrogen, this may be used as the hydrogen-containing gas.

Before, or preferably after, compression of the feedstock, steam is mixed with the feedstock: this steam introduction may be effected by direct injection of steam and/or by saturation of the feedstock, or a mixture thereof with the recycled carbon dioxide, by contact with a stream of heated water. The amount of steam is preferably minimised as this leads to a more efficient process. It is preferred that the steam ratio is below 1.8.

In the process of the invention carbon dioxide is recovered and recycled from the de-watered secondary reformed gas, before or after the latter is used for synthesis. Preferably the amount of recycled carbon dioxide is at least 60%, particularly at least 90%, of the carbon dioxide in the de-watered secondary reformed gas. The recycled carbon dioxide may be incorporated before or, preferably, after mixing the steam with the hydrocarbon feedstock.

The resultant feedstock/steam/carbon dioxide mixture is then subjected to reforming. Before it is fed to the heat exchange reformer, the feedstock/steam mixture, before or after addition of the recycled carbon dioxide, may be subjected to a step of adiabatic low temperature reforming. In such a process, the hydrocarbon/steam mixture is heated, typically to a temperature in the range 400–600° C., and then passed adiabatically through a bed of a suitable catalyst, usually a catalyst having a high nickel content, for example above 40% by weight. During such an adiabatic low temperature reforming step any hydrocarbons higher than methane react with steam to give a mixture of methane, carbon oxides and hydrogen. The use of such an adiabatic reforming step, commonly termed pre-reforming, is desirable to ensure that the feed to the heat exchange reformer contains no hydrocarbons higher than methane and also contains a significant amount of hydrogen. This is desirable in order to minimise the risk of carbon formation on the catalyst in the heat-exchange reformer. Accordingly, where the recycled carbon dioxide also contains higher hydrocarbons, as in the case of a preferred embodiment of the invention, the gaseous mixture is preferably subjected to such a pre-reforming step and the recycled carbon dioxide is added prior to such a pre-reforming step. Where the recycled carbon dioxide does not contain higher hydrocarbons, it is preferably added to the gaseous mixture after any pre-reforming step.

After any such pre-reforming step, the mixture is further heated, if necessary, to the heat exchange reformer inlet temperature which is typically in the range 400–550° C. During passage through the reforming catalyst, which is usually nickel supported on a refractory support such as rings or pellets of calcium aluminate cement, alumina, titania, zirconia and the like, the endothermic reforming reaction takes place with the neat required for the reaction being supplied from the secondary reformed gas flowing past the exterior surface of the outer tubes. The temperature of the secondary reformed gas is preferably sufficient that the gas undergoing primary reforming in the annular space leaves the catalyst at a temperature in the range 650–800° C.

The primary reformed gas is then subjected to secondary reforming by adding a gas containing free oxygen, effecting partial combustion and passing the partially combusted gas through a secondary reforming catalyst. The secondary reforming catalyst is usually nickel supported on a refractory support such as rings or pellets of calcium aluminate cement, alumina, titania, zirconia and the like. The gas containing free oxygen is preferably substantially pure oxygen, e.g. oxygen containing less than 1% nitrogen. However where the presence of substantial amounts of inerts is permissible, the gas containing free oxygen may be air or enriched air. Where the gas containing free oxygen is substantially pure oxygen, for metallurgical reasons it is preferably fed to the secondary reformer at a temperature below about 250° C. The amount of oxygen-containing gas added is preferably such that 0.4 to 0.6 moles of oxygen are added per gram atom of hydrocarbon carbon fed to the primary reforming stage. Preferably the amount of oxygen added is such that the secondary reformed gas leaves the secondary reforming catalyst at a temperature in the range 800–1050° C. For a given feedstock/steam/carbon dioxide mixture, amount and composition of the oxygen-containing gas and reforming pressure, this temperature largely determines the composition of the secondary reformed gas.

The secondary reformed gas is then used to provide the heat required for the primary reforming step by using the secondary reformed gas as the hot gas flowing past the tubes of the heat exchange reformer. During this heat exchange the secondary reformed gas cools by transferring heat to the gas undergoing primary reforming. Preferably the secondary reformed gas cools by several hundred ° C. but of course it will leave the heat exchange reformer at a temperature somewhat above the temperature at which the feedstock/steam/carbon dioxide mixture is fed to the heat exchange reformer. Preferably the secondary reformed gas leaves the heat exchange reformer at a temperature in the range 500–650° C.

Under some operating conditions there is a risk of corrosion of the heat exchange reactor by the high temperature secondary reformed gas: such corrosion is believed to result from reaction of the carbon monoxide in the secondary reformed gas with iron in the metals employed for the heat exchange reformer construction. Where the reaction conditions are such that such a risk may occur, the iron may be passivated by introducing a sulphur compound, such as dimethyl disulphide into the secondary reformed gas after it leaves the secondary reforming catalyst and before it enters the heat exchange reformer. The amount of such sulphur compound necessary to obviate such corrosion problems is typically such as to give a sulphur content of 0.2–20 ppm by volume in the secondary reformed gas.

After leaving the heat exchange reformer, the secondary reformed gas is then further cooled. Heat recovered during this cooling may be employed for reactants pre-heating and/or for heating water used to provide the steam employed in the primary reforming step. As described hereinafter, the recovered heat may additionally, or alternatively, be used in a carbon dioxide separation step.

Where a sulphur compound has been added to the secondary reformed gas as mentioned above, and the final product is to be used in reactions employing catalysts that are poisoned by sulphur compounds, the sulphur compounds may be removed from the secondary reformed gas after some cooling thereof. For example the sulphur compounds may be removed by passing the secondary reformed gas through a bed of a suitable absorbent for sulphur compounds, such as zinc oxide. Preferably two beds of absorbent are employed in series with suitable flow connections to enable one bed to be taken off-line temporarily and replenished with fresh absorbent without shutting down the reforming process.

The secondary reformed gas is cooled to a temperature below the dew point of the steam in the secondary reformed gas so that the steam condenses. The condensed steam is then separated. The cooling to effect condensation of the steam may be effected by contacting the secondary reformed gas with a stream of cold water: as a result a stream of heated water is formed which may be used to supply some or all of the steam required for reforming.

After separation of the condensed water, the de-watered secondary reformed gas typically contains 5 to 15% by volume of carbon dioxide. In one embodiment of the invention, the de-watered secondary reformed gas is then subjected to a carbon dioxide separation step. This may a conventional "wet" process wherein the de-watered secondary reformed gas is contacted with a stream of a suitable absorbent liquid, such as an amine, particularly methyl diethanolamine (MDEA) solution so that the carbon dioxide is absorbed by the liquid to give a laden absorbent liquid and a gas stream having a decreased content of carbon dioxide. The laden absorbent liquid is then regenerated, for example by heating, to desorb the carbon dioxide and to give a regenerated absorbent liquid, which is then recycled to the carbon dioxide absorption stage. At least part of the desorbed carbon-dioxide is recycled to the gaseous mixture subjected reforming step as described above. If the carbon dioxide separation step is operated as a single pressure process, i.e. essentially the same pressure is employed in the absorption and regeneration steps, only a little recompression of the recycled carbon dioxide will be required. Unless it is desired that the product synthesis gas has a very low carbon dioxide content, it is generally not necessary to effect the regeneration of the absorbent liquid to a very low carbon dioxide content. Preferably at least 75%, particularly at least 90%, of the carbon dioxide in the secondary reformed gas is separated in the carbon dioxide separation stage.

Instead of using a "wet" carbon dioxide removal stage, a pressure swing adsorption process may be employed.

Before use for the synthesis of carbon-containing compounds, some of the hydrogen may be separated from the de-watered secondary reformed gas if desired in order to modify the $[H_2]/[CO]$ ratio. This hydrogen separation may be effected at the same time as carbon dioxide separation, e.g. by using a pressure-swing adsorption process, or it may be separated in a separate step using a membrane separation unit.

In another embodiment of the invention, which is applicable where the presence of carbon dioxide can be tolerated in the subsequent processing f the de-watered secondary reformed gas stream, the de-watered secondary reformed gas, after any step of hydrogen separation as aforesaid, is used for the synthesis of the carbon-containing compounds, e.g. Fischer-Tropsch synthesis. Generally, such syntheses are incomplete and a stream of unreacted gas is discharged from the synthesis step. In this embodiment, the recycled carbon dioxide is taken from the unreacted gas. Often there is no need for separation of the carbon dioxide from the unreacted gas: thus some or all of the unreacted gas can be recycled to provide the recycled carbon dioxide. In Fischer-Tropsch synthesis, as a result of incomplete separation of the synthesised hydrocarbons, this unreacted gas will contain some hydrocarbons. By recycle of some or all of the unreacted gas as the recycled carbon dioxide, these hydrocarbons may thus also be recycled and so form part of the reformer feed.

Figure 2:
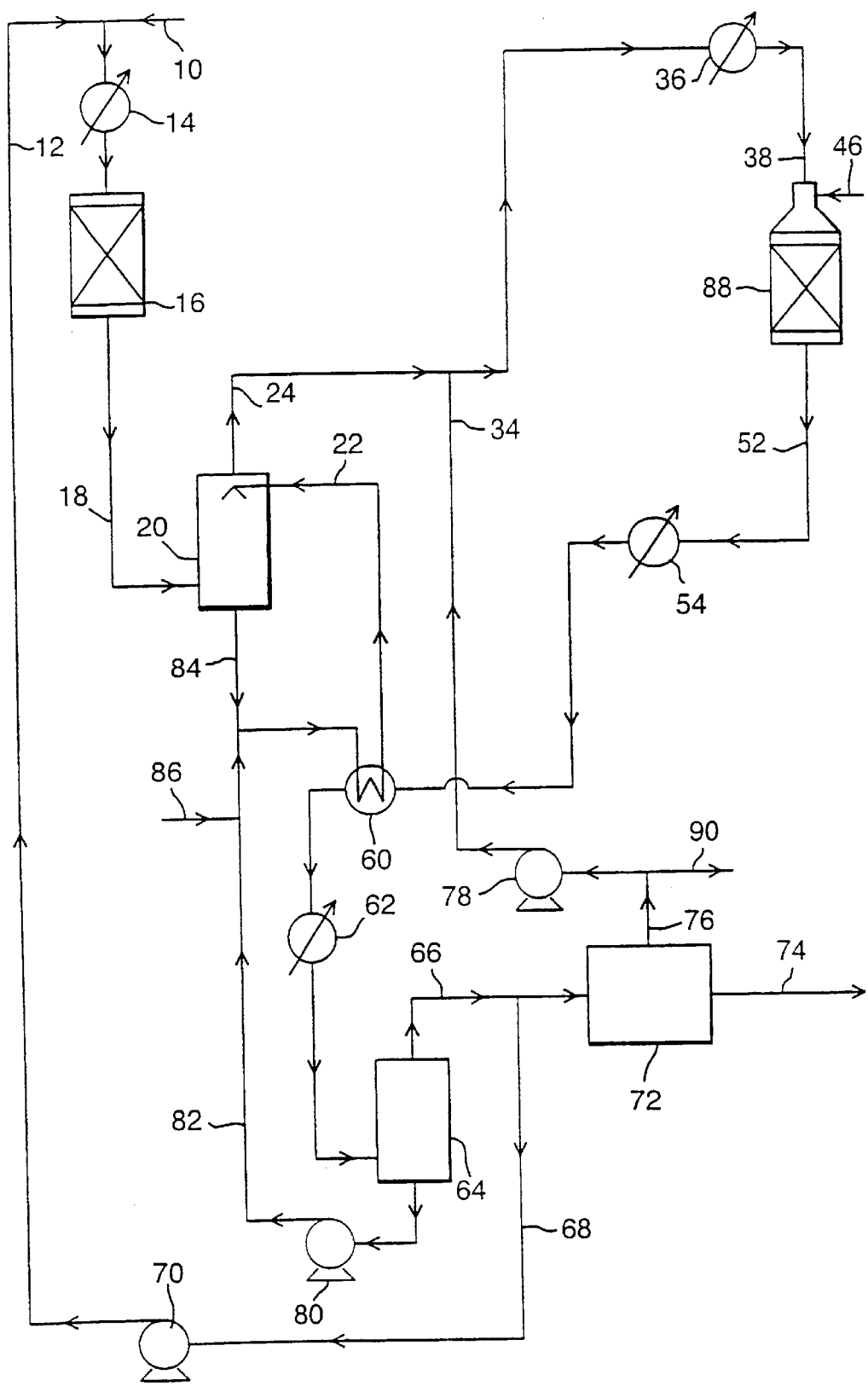

The invention is illustrated by reference to the accompanying drawings in which FIG. 1 is a flow sheet of one embodiment of the process, and FIG. 2 is a flowsheet of a process using an autothermal reformer by way of comparison.

Figure 3:
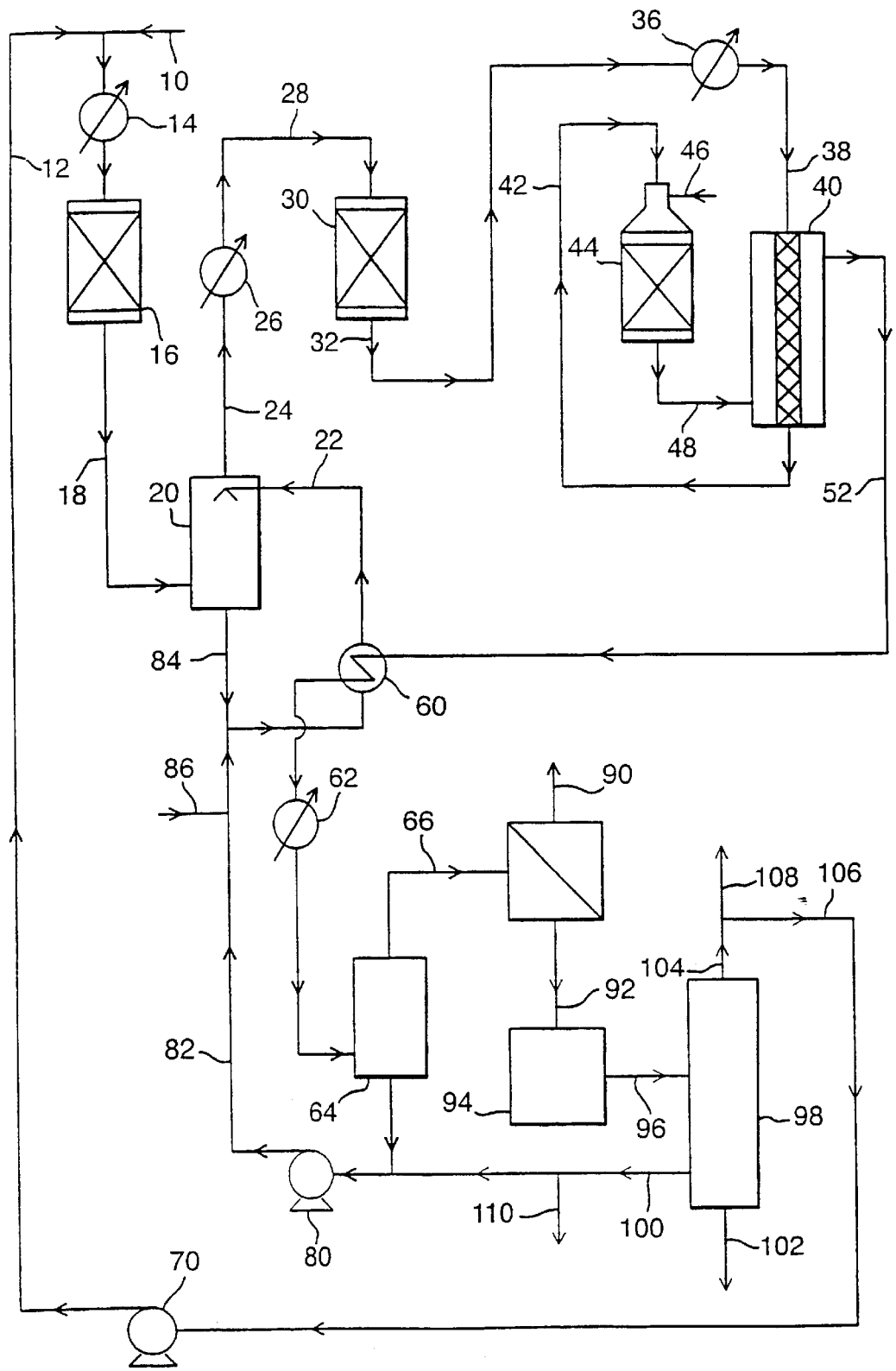

FIG. 3 is a flowsheet of a second embodiment of the invention.

Referring to FIG. 1, natural gas at an elevated pressure, typically in the range 15 to 50 bar abs., is fed via line 10 and mixed with a small amount of a hydrogen-containing gas fed via line 12. The mixture is then heated in heat exchanger 14 and fed to a desulphurisation stage 16 wherein the gas mixture is contacted with a bed of a hydro-desulphurisation catalyst, such as nickel or cobalt molybdate, and an absorbent, such as zinc oxide, for hydrogen sulphide formed by the hydro-desulphurisation. The desulphurised gas mixture is then fed, via line 18, to a saturator 20, wherein the gas contacts a stream of heated water supplied via line 22. The saturated gas leaves the saturator via line 24 and is then further heated in heat exchanger 26 to the desired inlet temperature for a stage of low temperature adiabatic reforming. The saturated gas is then passed via line 28 to a stage 30 of adiabatic catalytic low temperature reforming.

The process gas leaves the adiabatic low temperature reforming stage 30 via line 32 and is mixed with recycled carbon dioxide supplied via line 34 and then further heated in heat exchanger 36 to the desired heat exchange reformer inlet temperature. In an alternative arrangement, heat exchanger 36 is provided in line 34 to heat the carbon dioxide before it is mixed with the process gas. Heat exchangers 26 and 36 may conveniently be tubes heated by combustion of a suitable gas stream, e.g. part of the feedstock. The heated process gas is then fed, via line 38, to the catalyst-containing tubes of a heat exchange reformer 40. The tubes contain a suitable primary reforming catalyst. For simplicity in the drawing only a single tube is shown but it will be appreciated that normally there will be a multiplicity of tubes, for example several hundred on a large scale plant. The gas undergoes primary reforming in the heat exchange reformer and then is fed, via line 42, to a secondary reformer 44 where it undergoes partial combustion with an oxygen-containing gas supplied via line 46, and then further catalytic reforming by passage through a bed of secondary reforming catalyst. The secondary reformed gas leaves the secondary reformer 44 via line 48 and is then fed to the heat exchange reformer 40 as the heating medium thereof. Where there is a risk of corrosion of the metalwork of the heat exchange reformer, a suitable sulphur compound may be added to the secondary reformed gas via line 50. Alternatively the sulphur compound may be added to the process gas leaving the tubes of the heat exchange reformer before the process gas is fed to the secondary reformer. The secondary reformed gas flows past the tubes of the heat exchange reformer 40 thereby supplying the heat required for the primary reforming and then leaves the heat exchange reformer via line 52. The reformed gas is then cooled in heat exchanger 54, which may be a steam-raising boiler.

Where a sulphur compound is added via line 50, it may be removed by passing the reformed gas through beds 56 and 58 of a suitable sulphur absorbent. These beds are arranged such that when bed 56 becomes saturated with sulphur, the reformed gas is fed directly to bed 58 and bed 56 is taken off-line and replenished with fresh absorbent. When bed 56 has been replenished, it is re-introduced into the process line as the downstream bed in readiness for when bed 58 becomes saturated with sulphur.

The reformed gas is then further cooled by heating water in a heat exchanger 60 and then cooled to below the dew point of the steam in the reformed gas in a cooler 62. The cooled gas then passes to a separator 64 wherein condensed water is separated. The de-watered process gas then leaves the separator via line 66. A small part of this gas stream is recycled, via line 68 and circulator 70, to line 12 as the hydrogen-containing gas added to the feedstock for hydrodesulphurisation. The remainder of the de-watered process gas from line 66 is fed to a carbon dioxide separation stage 72. The carbon dioxide-depleted process gas stream leaves carbon dioxide separation stage 72 via line 74 as the product gas and comprises hydrogen and carbon monoxide. It will also contain a small proportion of methane, and possibly some nitrogen and a small proportion of steam and carbon dioxide.

The carbon dioxide separated in carbon dioxide separation stage 72 leaves the carbon dioxide separation stage via line 76 and is recycled to line 34 via circulator 78.

The water separated in separator 64 is recycled via circulator 80 and line 82 and mixed with the excess of water leaving the lower end of saturator 20 via line 84. Make-up water is added via line 86. The combined water streams are heated in heat exchanger 60 to form the stream of hot water fed to saturator 20 via line 22.

Steam raised in e.g. heat exchanger 54 may be used as the heating medium for heat exchanger 14 and, if required, as a source of heat in the carbon dioxide separation stage 72. It may also be used to pre-heat the oxygen-containing gas fed via line 46. The steam may also be let down in a turbine to drive the circulators and other pumps etc. and to drive machines in other sections of the plant.

The calculated gas compositions, temperatures and pressures of an example of the invention using the flowsheet of FIG. 1 are shown in the following Table 1 (all flow rates are in kmol/h and have been rounded to the nearest integer).

TABLE 1

| | Flow rate (kmol/h) | | | | | | T | P (bar |
|---|---|---|---|---|---|---|---|---|
| | $CH_4$ | CO | $CO_2$ | $H_2$ | $N_2$ | $O_2$ | $H_2O$ | (° C.) | abs) |
| 10 | 2453* | | 3 | | 20 | | | 30 | 35 |
| 12 | 0 | 25 | 10 | 50 | 0 | | | 30 | 35 |
| 28 | 2453* | 25 | 13 | 50 | 20 | | 3762 | 475 | 30 |
| 32 | 2410 | 2 | 123 | 433 | 20 | | 3543 | 446 | 30 |
| 34 | | | 1027 | | | | | 40 | 30 |
| 38 | 2410 | 2 | 1151 | 433 | 20 | | 3543 | 475 | 30 |
| 42 | 1818 | 283 | 432 | 2517 | 20 | | 2644 | 714 | 25 |
| 46 | | | | | 6 | 1180 | | 230 | 25 |
| 48 | 48 | 2477 | 1038 | 5046 | 26 | | 3654 | 1000 | 25 |
| 52 | 48 | 2477 | 1038 | 5046 | 26 | | 3654 | 613 | 25 |
| 74 | 48 | 2452 | | 4996 | 26 | | | 40 | 25 |

*plus 15 kmol/h ethane, 5 kmol/h propane and 3 kmol/h butane

The product gas flow rate is about 7522 kmol/h and contains about 1% of inerts (methane and nitrogen) and has a [$H_2$]/[CO] ratio of 2.04. For a total of 2510 kg atoms/h of hydrocarbon carbon fed to the reforming stage, 1186 kmol/h of 99.5% oxygen is required together with 108 kmol/h of make-up water. The steam to hydrocarbon carbon ratio in the saturated process gas (line 24) is 1.5. 1027 kmol/h of carbon dioxide has to be separated in separation stage 72.

By way of comparison, in the embodiment of FIG. 2, heat exchanger 26 and the adiabatic low temperature reforming stage are omitted. The combination of the heat exchanger reformer and secondary reformer is replaced by a stage of autothermal reforming wherein the heated mixture of saturated feedstock and recycled carbon dioxide are fed via line 38 to an autothermal reformer 88 wherein preheated oxygen is added via line 46 to effect partial combustion and the partially combusted mixture passed over a secondary reforming catalyst. The beds 56 and 58 of sulphur absorbent are also omitted. In this embodiment part of the separated carbon dioxide is vented from line 76 via line 90.

The calculated gas compositions, temperatures and pressures of an example using the flowsheet of FIG. 2 using the same amount of feedstock are shown in the following Table 2 (all flow rates are in kmol/h and have been rounded to the nearest integer). Since it is normally possible to operate autothermal reforming at a lower steam to hydrocarbon carbon ratio than when using the flowsheet of FIG. 1, in this calculated example a steam to hydrocarbon carbon ratio of 1 is assumed for the saturated gas.

TABLE 2

| | Flow rate (kmol/h) | | | | | | | T | P (bar |
|---|---|---|---|---|---|---|---|---|---|
| | $CH_4$ | CO | $CO_2$ | $H_2$ | $N_2$ | $O_2$ | $H_2O$ | (° C.) | abs) |
| 10 | 2453* | | 3 | | 20 | | | 30 | 35 |
| 12 | 1 | 22 | 8 | 46 | 0 | | | 30 | 35 |
| 24 | 2453* | 22 | 11 | 46 | 20 | | 25086 | 193 | 32 |
| 34 | | | 565 | | | | | 40 | 30 |
| 38 | 2453* | 22 | 575 | 46 | 20 | | 2508 | 522 | 30 |
| 46 | | | | | 8 | 1504 | | 230 | 25 |

TABLE 2-continued

| | Flow rate (kmol/h) | | | | | | | T | P (bar |
|---|---|---|---|---|---|---|---|---|---|
| | CH$_4$ | CO | CO$_2$ | H$_2$ | N$_2$ | O$_2$ | H$_2$O | (° C.) | abs) |
| 52 | 57 | 2246 | 803 | 4587 | 28 | | 2837 | 1000 | 25 |
| 74 | 57 | 2223 | | 4541 | 28 | | | 40 | 25 |

*plus 15 kmol/h ethane, 5 kmol/h propane and 3 kmol/h butane

The product gas flow rate of about 6849 kmol/h is thus only about 91% of that of the FIG. 1 embodiment and the product gas is less pure, containing about 1.2% of inerts (methane and nitrogen), and has a [H$_2$]/[CO] ratio of 2.04. For a total of 2511 kg atoms/h of hydrocarbon carbon fed to the reforming stage, 1512 kmol/h of 99.5% oxygen is required, i.e. 27% more than in the FIG. 1 embodiment. As a result of the large amount of oxygen necessary (in order to achieve a high autothermal reformer out let temperature giving a product having a similar methane content to that of the FIG. 1 embodiment) the process is a net water producer: hence it is not necessary to add water via line 86; rather 329 kmol/h of the condensate can be discharged from the bottoms of the separator 64 instead of being recycled. Carbon dioxide is separated in separator 72 at a rate of 795 kmol/h, i.e. 77% of the rate in the FIG. 1 embodiment, but 231 kmol/h of carbon dioxide has to be vented via line 90.

In the embodiment of FIG. 3, a variation of the embodiment of FIG. 1 is shown adapted for Fischer-Tropsch synthesis. In this flowsheet, for simplicity the sulphur injection via line 50, and the sulphur removal stages 56 and 58, as well as heat exchanger 54, are omitted, but it will be appreciated that these may be incorporated if required.

The de-watered process gas from line 66 is fed to a membrane separation unit 88 where part of the hydrogen in the process gas is separated as a permeate stream 90 leaving an impermeate stream 92 having a [H$_2$]/[CO] ratio suited to Fischer-Tropsch synthesis, e.g. about 2.1. [It will be appreciated, that if the process gas in line 66 already has a [H$_2$]/[CO] ratio suited to Fischer-Tropsch synthesis. This membrane separation unit 88 can be omitted.]

The permeate stream 92 is fed to one or more Fischer-Tropsch synthesis stages 94, which will include heating and cooling as necessary—for simplicity these are omitted from FIG. 3—giving a cooled products stream 96 comprising synthesised hydrocarbons, water, and unreacted gas. This products stream 96 is fed to a separation stage 98, wherein the cooled products stream 96 is separated into a water stream 100, a liquid hydrocarbons stream 102 (which is the desired Fischer-Tropsch synthesis product), and an unreacted gas stream 104.

Since little of the carbon dioxide in the de-watered process gas stream 66 is separated in the membrane separation stage 88 (if used) and is largely unreacted in the Fischer Tropsch synthesis stage 94, the unreacted gas stream 104 contains a significant amount of carbon dioxide. A major part of this unreacted gas stream 104 is taken via line 106 and used as the recycled carbon dioxide stream. As it also contains some hydrogen, it is recycled to circulator 70 to give the hydrogen-containing stream added to the feedstock via line 12. Circulator 70 effects compression of the recycled stream to a pressure similar to that of the natural gas supply 10. Thus in this embodiment, the carbon dioxide is recycled to the feed to the desulphurisation step 16 rather than being added after the stage of adiabatic catalytic low temperature reforming 30.

The remainder of the unreacted gas stream 104 is taken via line 108 and may be used as fuel, e.g. to heat heat exchangers 26 and/or 36. The hydrogen separated as stream 90 may likewise be used as fuel or exported to a user of hydrogen.

Part of the water stream 100 from separator 98 may be purged via line 110 and the remainder added to the water separated in separator 64 and fed to the circulator 80.

The calculated gas compositions, temperatures and pressures of an example of the invention using the flowsheet of FIG. 3 producing approximately 10000 barrels per day (roughly 1600 m$^3$) of Fischer-Tropsch liquids (FTL), which for simplicity are here considered to have an average composition approximating to heptane, are shown in the following Table 3 (all flow rates are in kmol/h and have been rounded to the nearest integer).

TABLE 3

| | | Flow rate (kmol/h) | | | | | | | | |
|---|---|---|---|---|---|---|---|---|---|---|
| | CH$_4$ | FTL | CO | CO$_2$ | H$_2$ | N$_2$ | O$_2$ | H$_2$O | T (° C.) | P (bar abs) |
| 10 | 4105[a] | | | 4 | | 34 | | | 30 | 30 |
| 12 | 159[b] | | 61 | 369 | 1180 | 724 | 109 | 41 | 65 | 30 |
| 28 | 4264[c] | | 61 | 369 | 1184 | 724 | 143 | 7378 | 500 | 25 |
| 32 | 4733 | | | 67 | 1645 | 1163 | 143 | 6760 | 519 | 25 |
| 46 | | | | | 11 | | 2178 | | 230 | 30 |
| 52 | 104 | | | 4694 | 1646 | 10696 | 154 | 6484 | 545 | 25 |
| 66 | 104 | | | 4694 | 1645 | 10696 | 154 | 57 | 40 | 22 |
| 90 | | | | 25 | 838 | | | | 40 | 5 |
| 92 | 104 | | | 4694 | 1620 | 9858 | 154 | 57 | 40 | 22 |
| 100 | | | | 1 | | | | 3987 | 65 | 18 |
| 102 | 1[d] | 454 | 9 | 30 | 17 | 1 | | 27 | 65 | 18 |
| 104 | 224[e] | | 86 | 520 | 1665 | 1021 | 154 | 57 | 65 | 18 |

[a]plus 25 kmol/h ethane, 8 kmol/h propane and 4 kmol/h butane
[b]10 kmol/h ethane and 22 kmol/h butane
[c]plus 36 kmol/h ethane, 8 kmol/h propane and 25 kmol/h butane
[d]plus 8 kmol/h butane
[e]plus 15 kmol/h ethane and 31 kmol/h butane The reforming is operated at a steam ratio of 1.5 and the de-watered process gas has a carbon dioxide content of about 9.5% by volume. 4889 kg atoms/h of hydrocarbon carbon are fed to the reforming stage and the amount of 99.5% oxygen employed is about 2189 kmol/h. The temperature of the secondary reformed gas stream 52 was about 1000° C. It is seen that about 71% of the unreacted gas stream 104 is recycled and this recycled gas represents a recycle of about 72% of the carbon dioxide in the de-watered process gas.

What is claimed is:

1. A process for the synthesis of carbon-containing compounds comprising the steps of:
   a) subjecting a feed gas mixture consisting essentially of i) a desulphurised hydrocarbon feedstock selected from methane, natural gas or naphta, ii) steam, and iii) recycle gas containing carbon dioxide, the amount of stream being 0.6 to 2 moles per gram atom of hydrocarbon carbon in said mixture, to catalytic primary reforming at an elevated temperature in a heat exchange reformer by passsing said mixture through tubes containing a steam reforming catalyst heated by a hot gas stream flowing past the exterior of said tubes, thereby forming a primary reformed process gas stream;
   b) without the addition of further hydrocarbon, subjecting the primary reformed process gas stream to secondary reforming wherein it is subjected to partial combustion with a gas containing free oxygen to form a hot partially combusted process gas stream which is then passed through a bed of a secondary reforming catalyst, thereby forming a secondary reformed process gas stream;
   c) passing said secondary reformed process gas stream past the exterior of the tubes of the heat exchange reformer as said hot gas stream, thereby heating the gas inside said tubes and cooling said secondary reformed process gas stream;
   d) further cooling said secondary reformed process gas stream, condensing stream therefrom, and separating out the condensed water to give a de-watered process gas stream, the reforming conditions being selected to give a de-watered process gas stream having a carbon dioxide content below 20% by volume;
   e) subjecting said de-watered process gas stream to a step of synthesis of carbon-containing compounds to give a reacted process gas stream containing synthesised carbon-containing compounds and unreacted gas; and
   f) separating synthesised carbon-containing compounds from the unreacted gas;
   wherein a carbon dioxide-containing gas stream is taken from the process gas stream after step d) and at least part of the carbon dioxide-containing gas stream is used as said recycle gas in the feed gas mixture before the latter is fed to the heat exchange reformer, the amount of carbon dioxide that is recycled being 0.2 to 0.6 moles per gram atom of hydrocarbon carbon in the feed gas mixture.

2. A process according to claim 1 wherein the amount of carbon dioxide that is recycled amounts to at least 60% of the carbon dioxide in the de-watered process gas.

3. A process according to claim 2 wherein the amount of carbon dioxide that is recycled amounts to at least 90% of the carbon dioxide in the de-watered process gas.

4. A process according to claim 1 wherein carbon dioxide is separated from the de-watered process gas before step e) and at least part of the separated carbon dioxide is recycled to the feed gas mixture.

5. A process according to claim 4 wherein the desulphurised hydrocarbon feedstock is subjected to a stage of adiabatic catalytic low temperature reforming with steam reforming at an inlet temperature in the range 400–600° C. prior to addition of the recycled carbon dioxide.

6. A process according to claim 1 wherein at least part of the unreacted gas stream remaining after separation of the synthesised carbon-containing compounds is recycled as the recycled carbon dioxide.

7. A process according to claim 6 wherein the recycled unreacted gas stream contains higher hydrocarbons and is added to the desulphurised hydrocarbon feedstock and then the resultant gas mixture is subjected to a stage of adiabatic catalytic low temperature reforming with steam before feeding to the heat exchange reformer.

8. A process according to claim 1 wherein a sulphur compound is added to the primary reformed process gas, before or after it is subjected to secondary reforming, but before the secondary reformed process gas is used to heat the tubes of the heat exchange reformer.

9. A process according to claim 8 wherein sulphur is removed from the secondary reformed process gas after it has been used to heat the tubes of the heat exchange reformer.

10. A process according to claim 1 wherein part of the hydrogen in the de-watered process gas is separated from the process gas prior to step e).

* * * * *

UNITED STATES PATENT AND TRADEMARK OFFICE
CERTIFICATE OF CORRECTION

PATENT NO. : 6,525,104 B2  Page 1 of 1
DATED : February 25, 2003
INVENTOR(S) : Peter E. J. Abbott It is certified that error appears in the above-identified patent and that said Letters Patent is hereby corrected as shown below:

Column 11,
Line 34, please delete the phrase "condensing stream therefrom," and insert the phrase -- condensing steam thereform, --.

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,525,104 B2
DATED           : February 25, 2003
INVENTOR(S)     : Peter E. J. Abbott It is certified that error appears in the above-identified patent and that said Letters Patent is hereby corrected as shown below:

<u>Column 11,</u>
Line 34, please delete the phrase "condensing stream therefrom," and insert the phrase -- condensing steam therefrom, --.

This certificate supersedes Certificate of Correction issued June 17, 2003.

Signed and Sealed this

Sixth Day of January, 2004

JAMES E. ROGAN
*Director of the United States Patent and Trademark Office*